(12) United States Patent
McCracken et al.

(10) Patent No.: US 9,904,915 B2
(45) Date of Patent: Feb. 27, 2018

(54) VIRTUALIZED ATM

(71) Applicant: NCR Corporation, Duluth, GA (US)

(72) Inventors: Heather McCracken, Fife (GB); Martin Smith, Dundee (GB); Norman G. Taylor, Dundee (GB)

(73) Assignee: NCR Corporation, Atlanta, GA (US)

( * ) Notice: Subject to any disclaimer, the term of this patent is extended or adjusted under 35 U.S.C. 154(b) by 385 days.

(21) Appl. No.: 13/962,212

(22) Filed: Aug. 8, 2013

(65) Prior Publication Data

US 2015/0046325 A1     Feb. 12, 2015

(51) Int. Cl.
| | |
|---|---|
| *G06F 15/177* | (2006.01) |
| *G06Q 20/10* | (2012.01) |
| *G06F 9/44* | (2018.01) |
| *G06F 9/455* | (2018.01) |
| *G07F 19/00* | (2006.01) |
| *G06Q 20/40* | (2012.01) |

(52) U.S. Cl.
CPC ....... *G06Q 20/1085* (2013.01); *G06F 9/4416* (2013.01); *G06F 9/4445* (2013.01); *G06F 9/45558* (2013.01); *G06Q 20/40* (2013.01); *G07F 19/20* (2013.01); *G07F 19/211* (2013.01); *G06F 2009/45595* (2013.01)

(58) Field of Classification Search
CPC .. G06Q 20/1085; G06Q 20/40; G06Q 9/4416; G06Q 9/4445; G06Q 9/45558; G07F 19/20; G07F 19/211
See application file for complete search history.

(56) References Cited

U.S. PATENT DOCUMENTS

| | | | |
|---|---|---|---|
| 6,676,018 B1 * | 1/2004 | Trelawney | G07F 19/20 235/379 |
| 6,964,368 B1 * | 11/2005 | Trelawney | G07F 19/20 235/375 |
| 7,545,816 B1 * | 6/2009 | Coutts | G06Q 20/1085 235/375 |
| 7,555,461 B1 * | 6/2009 | Drummond | G06F 9/548 705/35 |

(Continued)

FOREIGN PATENT DOCUMENTS

WO     2005/110023     11/2005

OTHER PUBLICATIONS

Li Yan: "Development and application of desktop virtualization technology", Communication Software and Networks (ICCSN), 2011 IEEE 3rd International Conference on, IEEE, May 27, 2011 (May 27, 2011), pp. 326-329, XP032049822, DOI: 10.1109/ICCSN. 2011.6013725 ISBN: 978-1-61284-485-5 p. 326-328.

(Continued)

*Primary Examiner* — Moustafa M Meky
*Assistant Examiner* — Blake Rubin
(74) *Attorney, Agent, or Firm* — Schwegman, Lundberg & Woessner (57) ABSTRACT

A method and apparatus are disclosed for operating an Automated Teller Machine (ATM). The method includes the steps of receiving access to a virtualized operating system and ATM application at an ATM and performing a customer transaction at the ATM using the access to the virtualized operating system and ATM application. A recovery program may be provided to control the ATM if a communication link fails between the ATM and a server providing the access.

15 Claims, 2 Drawing Sheets

(56) References Cited

U.S. PATENT DOCUMENTS

| | | | | |
|---|---|---|---|---|
| 7,747,527 | B1* | 6/2010 | Korala | G06Q 20/108 705/35 |
| 7,849,011 | B1* | 12/2010 | McCoy | G06F 21/575 705/35 |
| 7,857,207 | B1* | 12/2010 | Hopkins, III | G07F 19/20 221/9 |
| 7,959,072 | B1* | 6/2011 | Jenkins | G06Q 20/1085 235/375 |
| 8,181,854 | B1* | 5/2012 | Folk | G06Q 30/0267 235/375 |
| 8,201,732 | B1* | 6/2012 | Kropf | G06Q 20/108 235/379 |
| 8,490,868 | B1* | 7/2013 | Kropf | G07F 19/206 235/379 |
| 8,589,731 | B1* | 11/2013 | Munson | G06F 11/1438 714/15 |
| 9,047,728 | B1* | 6/2015 | Irudayam | G06Q 20/3221 |
| 2002/0032655 | A1* | 3/2002 | Antonin | G06Q 20/1085 705/43 |
| 2002/0091870 | A1* | 7/2002 | Madl | G06F 9/545 719/313 |
| 2002/0124061 | A1* | 9/2002 | Mossman | G06Q 10/10 709/220 |
| 2003/0040959 | A1* | 2/2003 | Fei | G06Q 20/10 705/14.4 |
| 2003/0120597 | A1* | 6/2003 | Drummond | G06F 3/023 705/43 |
| 2003/0140179 | A1* | 7/2003 | Wilt | G06F 9/3851 719/321 |
| 2003/0217005 | A1* | 11/2003 | Drummond | G06F 3/023 705/43 |
| 2004/0128201 | A1* | 7/2004 | Ofir | G06Q 20/04 705/17 |
| 2005/0144133 | A1* | 6/2005 | Hoffman | C07K 14/53 705/50 |
| 2005/0171907 | A1* | 8/2005 | Lewis | G06Q 20/108 705/43 |
| 2005/0233287 | A1* | 10/2005 | Bulatov | G09B 21/006 434/114 |
| 2006/0218061 | A1* | 9/2006 | Mouline | G06Q 40/00 705/35 |
| 2007/0034680 | A1* | 2/2007 | Gomes | G06Q 20/1085 235/379 |
| 2009/0083182 | A1* | 3/2009 | Coventry | G06Q 20/1085 705/43 |
| 2009/0104954 | A1* | 4/2009 | Weber | G07F 17/32 463/1 |
| 2009/0159661 | A1* | 6/2009 | Sanches | G06Q 40/00 235/379 |
| 2009/0199053 | A1* | 8/2009 | Neilan | G07F 9/026 714/57 |
| 2009/0259592 | A1* | 10/2009 | Isaacson | G06Q 20/10 705/72 |
| 2010/0230486 | A1* | 9/2010 | Smith | G06Q 20/1085 235/379 |
| 2011/0179305 | A1* | 7/2011 | Lammel | G06F 11/2033 714/4.21 |
| 2011/0231705 | A1* | 9/2011 | McGraw, IV | G07F 19/20 714/27 |
| 2012/0259778 | A1* | 10/2012 | Banerjee | G06Q 20/10 705/43 |
| 2013/0097077 | A1* | 4/2013 | Bachrany | G06Q 40/02 705/43 |
| 2013/0179346 | A1* | 7/2013 | Kumnick | G06Q 20/40145 705/44 |
| 2013/0211833 | A1* | 8/2013 | Edwards | G07F 9/023 704/235 |
| 2014/0149286 | A1* | 5/2014 | Forsyth | G07F 19/20 705/43 |
| 2014/0331294 | A1* | 11/2014 | Ramallo | G06F 21/6245 726/5 |

OTHER PUBLICATIONS

Ricardo A Baratto et al: "Thinc: A Remote Display Architecture for Thin-Client Computing", (Online) Jul. 1, 2004 (Jul. 1, 2004), Technical Report CUCS-027-04, Department of Computer Science Columbia University, US, pp. 1-15, XP008146575, Retrieved from the Internet: URL:htttph://www.cs.columbia.edu/techreports/cucs-027-04.pdf> p. 277-284.

European Search Report dated Mar. 9, 2015 in EP Application No. 14175313.7 (EP2835791).

Wikipedia: "Automated teller machine", Jun. 20, 2013 (Jun. 20, 2013), XP055156927, Retrieved from the internet: URL: http://en.wikipedia.org/w/index.php?title=Automated_teller_machine&oldid=560778680 [retrieved on Dec. 5, 2014].

European Patent Office Action issued in co-pending European Patent Application EP14175313 dated Dec. 4, 2017.

* cited by examiner

VIRTUALIZED ATM

FIELD OF THE INVENTION

The present invention relates to a method and apparatus of operating an Automated Teller Machine (ATM). In particular, but not exclusively, the present invention relates to providing an ATM with access to a virtualized operating system and ATM application and performing customer transactions at the ATM using the access to the virtualized operating system and application.

BACKGROUND OF THE INVENTION

Many types of Self-Service Terminal (SST) are known whereby transactions are carried out at the SST by a user to receive and/or deposit items of media. For example, an Automated Teller Machine (ATM) is an example of an SST and it is known that users of ATMs can use such machines to deposit and/or withdraw currency notes. The control and operation of an ATM is complex and thus ATMs can be costly to manufacture and operate. Conventionally, a central processor and local data store (typically a disk drive) are provided in an ATM and the data store stores an Operating System (OS) and ATM application used by the ATM. This makes updating the operations which can be carried out at an ATM a time consuming and costly process because ATMs must be updated individually each time a change to the OS or ATM application is to be implemented.

SUMMARY OF THE INVENTION

It is an aim of the present invention to at least partly mitigate the above-mentioned problems.

It is an aim of certain embodiments of the present invention to provide an ATM with access to a virtualized operating system and ATM application which enables an ATM to perform one or more customer transactions using the access to the virtualized operating system and application.

It is an aim of certain embodiments of the present invention to allow an ATM to selectively receive portions of an operating system and ATM application from a remote server as required at the ATM.

It is an aim of certain embodiments of the present invention to provide an ATM which can receive user inputs from a customer and/or monitor events that occur at an ATM and which can forward these to a remote server and receive display data and device specific data from the server to enable a transaction to be performed at the ATM.

It is an aim of certain embodiments of the present invention to enable a communication link, between an ATM and a remote server that provides access to a virtualized operating system and ATM application, to be monitored and for a recovery program executing locally at the ATM to be able to take over control of the ATM if the communication link fails.

According to a first aspect of the present invention there is provided a method of operating an Automated Teller Machine (ATM), comprising the steps of:
receiving access to a virtualized operating system and ATM application at an ATM; and
performing a customer transaction at the ATM using the access to the virtualized operating system and ATM application.
Aptly, the step of receiving access to the virtualized operating system comprises the sub-steps of:
receiving a first portion of an operating system and ATM application at the ATM from a remote server via a communication link, whereby the first portion of the operating system and application comprises a portion of the operating system and ATM application that is currently required by the ATM;
executing the received first portion in memory at the ATM until the ATM requires a second portion of the operating system and ATM application;
requesting a second portion of the operating system and ATM application;
receiving the second portion of an operating system and ATM application at the ATM from a remote server via the communication link; and
executing the received second portion in memory at the ATM.

Aptly, the sub-step of receiving a first portion of an operating system and ATM application comprises the sub-step of receiving the first portion of the operating system and application as a plurality of memory pages; and
the sub-step of executing the received second portion in memory at the ATM optionally comprises the sub-step of over-writing memory pages containing the first portion of the operating system and ATM application currently stored in memory with the received plurality of memory pages corresponding to the received second portion of the operating system and ATM application.

The received plurality of memory pages corresponding to the received second portion of the operating system and ATM application may completely over-write the plurality of memory pages corresponding to the received first portion of the operating system and ATM application, such that no part of the first portion remains when the second portion is being executed.

The method may further comprise executing a recovery program at the ATM, for use if the communication link fails.

The step of executing a recovery program at the ATM, for use if the communication link fails, may include the sub-step of executing the recovery program in an area of memory different to an area of memory over-written by received portions of the operating system and ATM application. Alternatively, or additionally, the step of receiving portions of the operating system and the ATM application comprises: receiving a recovery program as part of the plurality of memory pages received each time a new portion of the operating system and ATM application is received at the ATM.

Aptly, the method further comprises, at the ATM, detecting if the communication link fails.

The step of detecting if the communication link fails may be implemented by the recovery program.

The step of detecting if the communication link fails may be implemented by pinging an IP address associated with the remote server, by monitoring network traffic to and from the remote server, or in any other convenient manner.

The method may comprise the further step of preventing, using the recovery program, any media that is part of an unfulfilled transaction from being accessible to a subsequent customer.

The step of preventing, using the recovery program, any media that is part of an unfulfilled transaction from being accessible to a subsequent customer may include accessing a status of a device, and issuing instructions to that device to retain, or purge any media that has been prepared for presentation to the customer, but not yet presented. The issued instructions may include retracting any media presented to a customer but not removed within a defined time limit.

By ensuring that the recovery program is always executing in memory (either by executing the recovery program in an area of memory never over-written by portions of the operating system and ATM application, or by incorporating the recovery program into each portion of the operating system and ATM application that is received and executed by the ATM), the recovery program is able to detect a loss in communications between the ATM and the remote server, and to put the ATM into an out-of-service state in a controlled manner in the event of such a loss in communications.

Aptly, the method further comprises:
receiving user inputs from a customer at the ATM;
monitoring events occurring at the ATM; and
providing, via a communication link, at least one of the received user inputs or the monitored events to a remote server executing the operating system and ATM application; whereby
the step of receiving access to the virtualized operating system and ATM application further comprises the steps of:
receiving, at the ATM, display data, device specific data and routing information for the device specific data from the remote server responsive to said inputs or events;
presenting the display data to the customer;
conveying the device specific data to a device at the ATM based on the routing information; and
implementing, at the device, one or more functions in response to the device specific data.

The step of receiving the display data, device specific data, and routing information may be implemented using a client associated with a virtual desktop infrastructure.

As used herein, the operating system and ATM application may include (i) a conventional (off-the-shelf) operating system, (ii) an ATM platform that extends and enhances the operating system to manage devices that are specific to an ATM (in other words, devices that are not usually provided on a personal computer, such as a cash dispenser, an encrypting PINpad, and the like), and (iii) an ATM application that allows customers to perform transactions at an ATM and service engineers to exercise devices at the ATM.

According to a second aspect of the present invention there is provided a method of operating an Automated Teller Machine (ATM), comprising the steps of:
determining if a communication link between an ATM and a remote server that provides the ATM with access to a virtualized operating system and ATM application is in a non-communicative state; and
if the communication link is in a non-communicative state, operating the ATM without requiring communication with the remote server.

Aptly, the step of determining if a communication link is in a non-communicative state includes the step of pinging an IP address of the server, monitoring network traffic, or the like.

Aptly, the step of operating the ATM without requiring communication with the remote server includes the sub-step of:
transferring control of the ATM to a recovery program executing in local memory at the ATM.

Aptly, the method further comprises receiving the recovery program from (i) the remote server or (ii) local non-volatile storage at the ATM.

Aptly, the method further comprises respectively (i) receiving the recovery program from the remote server as part of each portion of the operating system and ATM application received at the ATM or (ii) receiving the recovery program from the local storage prior to a customer transaction and executing that recovery program in an area of memory not used by the received portions of the operating system and ATM application.

Aptly, the method further comprises, subsequent to a communication link being in a non-communicative state, initiating a reconciliation process with the server when the communication link is re-established. The reconciliation process may include: recording details of any transaction being performed when the communication link enters the non-communicative state; recording whether media was presented to a customer immediately prior to the communication link entering the non-communicative state; recording whether presented media was retracted (or media being prepared for presentation was retained or purged) when the communication link entered the non-communicative state; and such like.

According to a third aspect of the present invention there is provided an Automated Teller Machine (ATM) for performing customer transactions using access to a virtualized operating system and ATM application, comprising:
a user interface for receiving customer input;
a network connector connectable, via a network, to a remote server that provides the ATM with access to a virtualized operating system and application; and
at least one processor and associated memory; wherein
a customer transaction is performed by the ATM accessing the virtualized operating system and application.

According to a fourth aspect of the present invention there is provided a server that provides a remote Automated Teller Machine (ATM) with access to a virtualized operating system and application.

Aptly, the server further comprises at least one software image of an operating system and an ATM application.

Aptly, the server further comprises a Server Hardware Platform (SHP);
a hypervisor running on the SHP; and
at least one ATM desktop operating system instance on the SHP.

According to a fifth aspect of the present invention there is provided a server for providing a plurality of remote Automated Teller Machines (ATMs) with access to a virtualized operating system and ATM application, the server comprising:
an image file including an operating system and ATM application for use by a plurality of remote ATMs;
an ATM status file for each remote ATM being provided with a virtualized operating system and ATM application, each ATM status file including information relating to a current transaction state of a respective ATM; and
a streaming manager for providing each ATM with selected portions of the virtualized operating system and application in response to requests from each ATM and based on a current transaction state of a respective ATM as indicated by the relevant ATM status file.

Aptly, the server comprises a plurality of image files, each image file corresponding to a respective ATM type.

As used herein, a virtualized operating system and ATM application means an operating system and ATM application that are not, as a whole, locally stored or locally executed, at the ATM. In certain embodiments of the present invention, parts of the operating system and ATM application are transferred, as required, to the ATM; in other embodiments, the whole operating system and ATM application is executed remotely, with a local program controlling display of information at the ATM and routing of device-specific data to devices at the ATM.

Aptly, the virtualized operating system and ATM application are provided by implementing a virtual desktop infrastructure.

Aptly, the ATM may execute a virtual desktop client.

Aptly, the recovery program controlling an ATM may perform one or more of the steps of displaying a screen on a user interface of the ATM indicating that a transaction cannot be completed at the ATM and/or returning a card inserted by a customer into the ATM to the customer and/or returning and/or retracting and/or capturing any non-stored item of media at the ATM and/or initiating a reconciliation process at the ATM.

Aptly, the reconciliation process may comprise recording details of a transaction that could not be completed (such as transaction time and any other relevant details available to the recovery program).

Aptly, the recovery program controlling the ATM performs the steps of ascertaining if the network connection is re-established to a communicative state and, in response thereto, passing control of the ATM to the virtualized operating system and application.

Aptly, when the ATM is handed over to the remote server a server reconciliation process is initiated at the server.

Certain embodiments of the present invention provide an ATM with access to a virtualized operating system and ATM application which enables customer transactions to be performed at the ATM using the access to the virtualized operating system and ATM application. As a result, modifications and/or amendments to an operating system and/or ATM application can be made at a single point in a network and thereafter be utilized by all ATMs networked so as to receive access to that virtualized operating system and ATM application.

Certain embodiments of the present invention overcome potential problems that may occur in using a virtualized ATM by ensuring that a recovery program is constantly executing at the ATM. This recovery program is written in memory and never overwritten at the ATM, or is constantly refreshed at the ATM so that control of the ATM can be carried out when a network communication link between the ATM and the remote server which provides access to a virtualized operating system and ATM application fails.

Certain embodiments of the present invention help ensure that when a network outage occurs any ATM card inserted by a customer is returned to that customer, even though a whole transaction cannot complete at an ATM.

BRIEF DESCRIPTION OF DRAWINGS

Embodiments of the present invention will now be described hereinafter, by way of example only, with reference to the accompanying drawings in which.

DESCRIPTION OF EMBODIMENTS

In the drawings like reference numerals refer to like parts.

Figure 1:
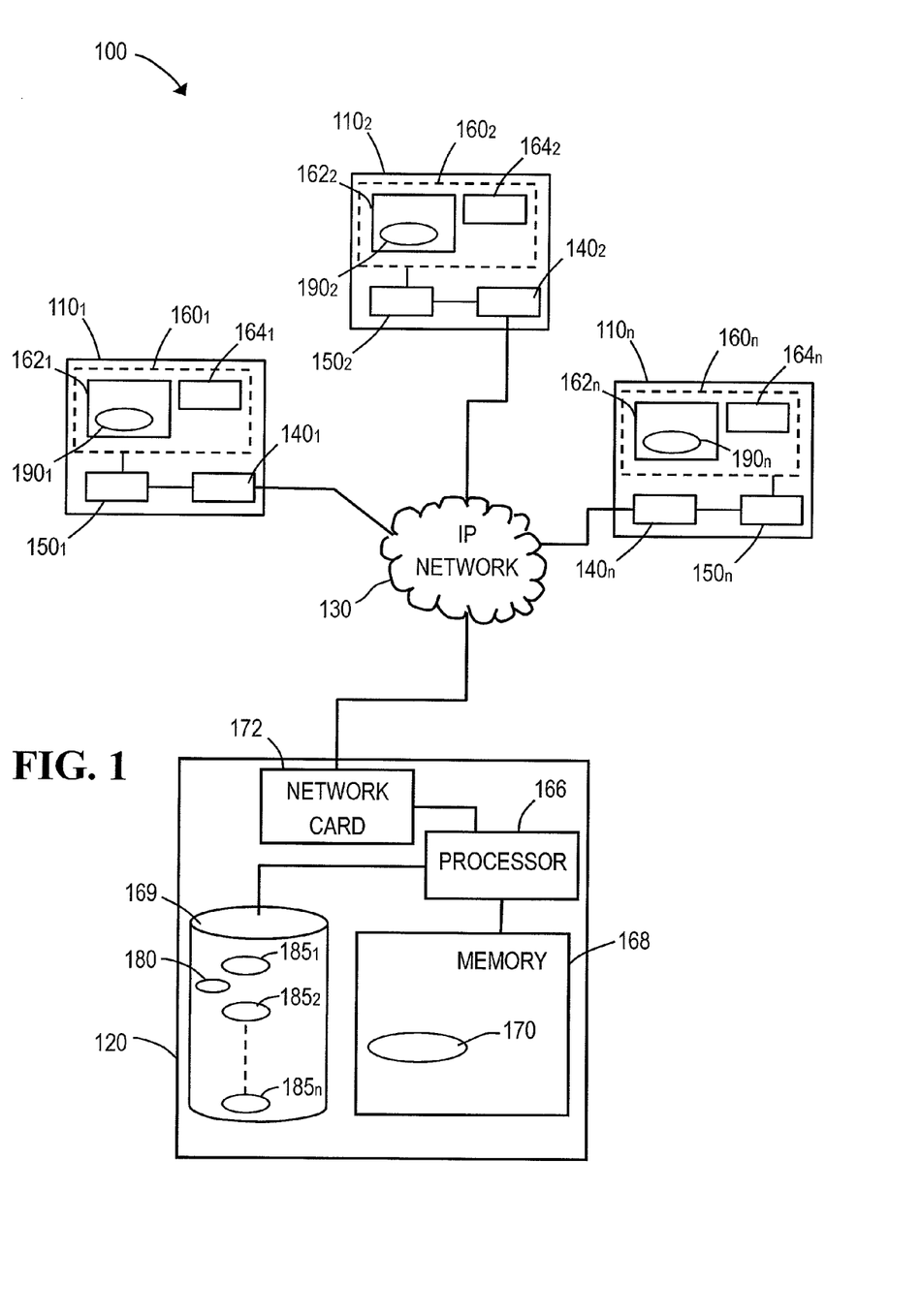
FIG. 1 is a schematic diagram illustrating a plurality of ATMs connected to a remote server via a network so that these ATMs can receive access to a virtualized operating system and ATM application using streaming, according to a first embodiment of the present invention.

FIG. 1 illustrates a system 100 which includes multiple Automated Teller Machines (ATMs) $110_{1\ldots n}$ and illustrates how these are connected to a remote server 120 via a secure Internet Protocol (IP) network 130. It should also be appreciated (although this is not illustrated in FIG. 1) that the remote server 120 is connected to a conventional transaction switch and/or authorization host (either via the IP network 130 or via a dedicated connection) to authorize transactions performed at one of the ATMs $110_{1\ldots n}$ in the system 100.

Each ATM 110 includes conventional modules (not shown) for enabling transactions to be performed and recorded by the ATM 110. These ATM modules include customer transaction modules and service personnel modules. The ATM modules include an ATM customer display, a card reader/writer module, an encrypting keypad module, a receipt printer module, a cash dispenser module, a journal printer module and the like. Each ATM 110 includes a network connection module (in the form of an Ethernet card) 140 which provides a connection to the remote server 120 via the IP network 130. Each ATM 110 includes a processor 150 and associated local memory 160 (shown by the broken line in FIG. 1 to indicate that it comprises a logical address space). The local memory 160 comprises, inter alia, DRAM 162 (which is used to store portions of an operating system and ATM application), and non-volatile RAM 164.

Each ATM $110_{1\ldots n}$ receives access to a virtualized operating system and ATM application at the ATM. Customer transactions are performed at the ATM using the access to the virtualized operating system and application. The three ATMs $110_{1\ldots n}$ shown in FIG. 1 receive access to the virtualized operating system and application via a streaming mechanism.

The server 120 which is remote from each ATM $110_{1\ldots n}$ comprises one or more processors 166, associated memory 168, and disk storage 169. During operation, the memory 168 stores various programs, including a streaming manager 170 which handles supplying relevant portions of an operating system and ATM application to the ATMs $110_{1\ldots n}$ as and when required. In this embodiment, the streaming manager 170 is a Wyse WSM (trade mark) streaming manager available from Wyse Technology Inc., 3471 N 1st St, San Jose, Calif. 95134, U.S.A.

The server 120 includes a network connection 172 (in the form of an Ethernet card) to provide access to the IP network 130. The server 120 also stores, in the disk storage 169, an image file 180 of an operating system and ATM application for the ATMs ATM $110_{1\ldots n}$. The image file 180 is created using a reference client application (not shown) provided as part of the Wyse WSM software; however, this reference client application is only needed to create the image file 180, it is not required during operation of the ATMs $110_{1\ldots n}$.

The server 120 also stores a plurality of ATM status files $185_{1\ldots n}$ (these may be referred to as cache files). There is an ATM status file $185_{1\ldots n}$ for each ATM $110_{1\ldots n}$ provided with access to a virtualized operating system and ATM application. Each ATM status file $185_{1\ldots n}$ is updated by the streaming manager 170 so that it stores data relating to a current transaction state of a respective ATM $110_{1\ldots n}$. If some of the ATMs $110_{1\ldots n}$ include a different network connection module, then those ATMs may require a different image file 180. In other words, each different type of network connection module may need a different image file 180. In this embodiment, for simplicity of description, each ATM $110_{1...n}$ accesses the same image file 180.

Each ATM $110_{1...n}$ selectively receives portions of the image file 180 from the remote server 120 via the network connection module 140. Each portion of the image file 180 is a portion of the operating system and ATM application. Each portion of the operating system and ATM application is a part of the entire operating system and ATM application, and is that portion which is currently required by the ATM $110_{1...n}$ according to a state of operation at that ATM $110_{1...n}$.

The received portions are executed locally at the ATM $110_{1...n}$ so that customer transactions, and service engineer functions, may be performed at the ATM $110_{1...n}$. An ATM (for example, ATM $110_1$) receives a portion of the image file 180 as a plurality of memory pages. These memory pages are written into the DRAM 162 of that ATM $110_1$. The ATM processor $150_1$ executes this received portion until a new portion is required (for example, because the necessary files or data are not present in the DRAM 162). The ATM processor $150_1$ then sends a request for the missing files or data to the operating system file system in a conventional manner (for example as would be done if the operating system was stored and executed locally). The network connection module 140 conveys this request to the server 120. The streaming manager 170 in the server 120 provides new memory pages corresponding to a new portion of the image file 180 in response to this request. The ATM processor $150_1$ then overwrites the memory pages in the DRAM 162 which correspond to previously used portions of the image file 180 with new and thus current memory pages.

Each time a new portion of the image file 180 is received at the ATM, from the server 120, the received portion includes a recovery program $190_{1...n}$ as part of the multiple memory pages written into the DRAM 162. That is to say, whenever a new portion of the image file 180 is received at the ATM $110_1$, the new portion is written into the DRAM 162. This ensures that from an initial start-up operation the recovery program $190_{1...n}$ is always executing locally at the ATM $110_1$.

Each ATM $110_{1...n}$ in the network receives a required part of an operating system and ATM application on demand as that part is needed. That is to say, as customer transactions are carried out and/or when a service engineer carries out a maintenance task at the ATM $110_{1...n}$, new pages are written into the DRAM $162_{1...n}$ as needed. The operating system of the illustrated ATMs $110_{1...n}$ is a Microsoft Windows 7 (trade mark) operating system, but it will be appreciated that other operating systems (such as other Microsoft operating systems, a Linux (trade mark) or Mac OS X (trade mark) operating system, or the like) could be utilized. The operating system and application is streamed from the remote server 120 to an ATM $110_{1...n}$ on demand. That is to say, when an ATM $110_{1...n}$ needs access to a part of an entire OS or ATM application that it does not have stored locally a request is made for a new part.

The recovery program $190_{1...n}$ in each ATM $110_{1...n}$ is used to monitor a network connection between a respective ATM $110_{1...n}$ and the server 120. Because an ATM $110_{1...n}$ receives access to a virtualized operating system and ATM application via the IP network 130 it is important that a communication link between the ATM $110_{1...n}$ and the server 120 providing access to the virtualized operating system and ATM application remains in a communicative state.

The recovery program $190_{1...n}$ which executes on an ATM $110_{1...n}$ monitors the state of the communication link. If the communication link fails, the recovery program $190_{1...n}$ takes over control of the ATM $110_{1...n}$. That is to say, the recovery program $190_{1...n}$ includes code to provide instructions for dealing with a communication link failure so that such a failure can be indicated to a customer at the ATM $110_{1...n}$ via the customer display (not shown) and/or an inserted customer card can be returned via a card reader module (not shown). The recovery program $190_{1...n}$ prevents any media that is part of an unfulfilled transaction from being accessible to a subsequent customer. This is implemented by the recovery program $190_{1...n}$ communicating directly with devices in the ATM $110_{1...n}$ (such as a customer display, a cash dispenser module, a card reader module, and the like) to ascertain the status of such devices (for example, media present in device, media being presented to a customer, media retracted to purge bin, and the like).

The recovery program $190_{1...n}$ is operable to issue instructions to those devices to ensure that media provided as part of the interrupted transaction is not accessible to a subsequent customer. These instructions may be to request the device to retain or purge any media that has been prepared for presentation to the customer, but not yet presented. These instructions may also be to request the device to retract any media presented to a customer but not removed within a defined time limit (such as thirty seconds).

The recovery program $190_{1...n}$ also includes instructions for continually monitoring the communication link after a failure and identifying when a communication link is re-established between an ATM $110_{1...n}$ and a remote server 120. When this occurs the recovery program $190_{1...n}$ initiates a reconciliation process identifying details of any transaction which may have been partly performed about the time of a communication link failure. Thereafter, an ATM $110_{1...n}$ is again provided with access to a virtualized operating system and ATM application from the remote server 120 so that normal operation of an ATM $110_{1...n}$ can resume.

It should now be appreciated that this embodiment has the advantage that an operating system and ATM application can be streamed to an ATM, and yet the ATM can be controlled even if access to the operating system and ATM application is interrupted or removed.

It should also be appreciated that the remote server 120 is connected to a conventional transaction switch and/or authorization host (either via the IP network 130 or via a dedicated connection) to authorize transactions performed at one of the ATMs $110_{1...n}$ in the system 100.

Figure 2:
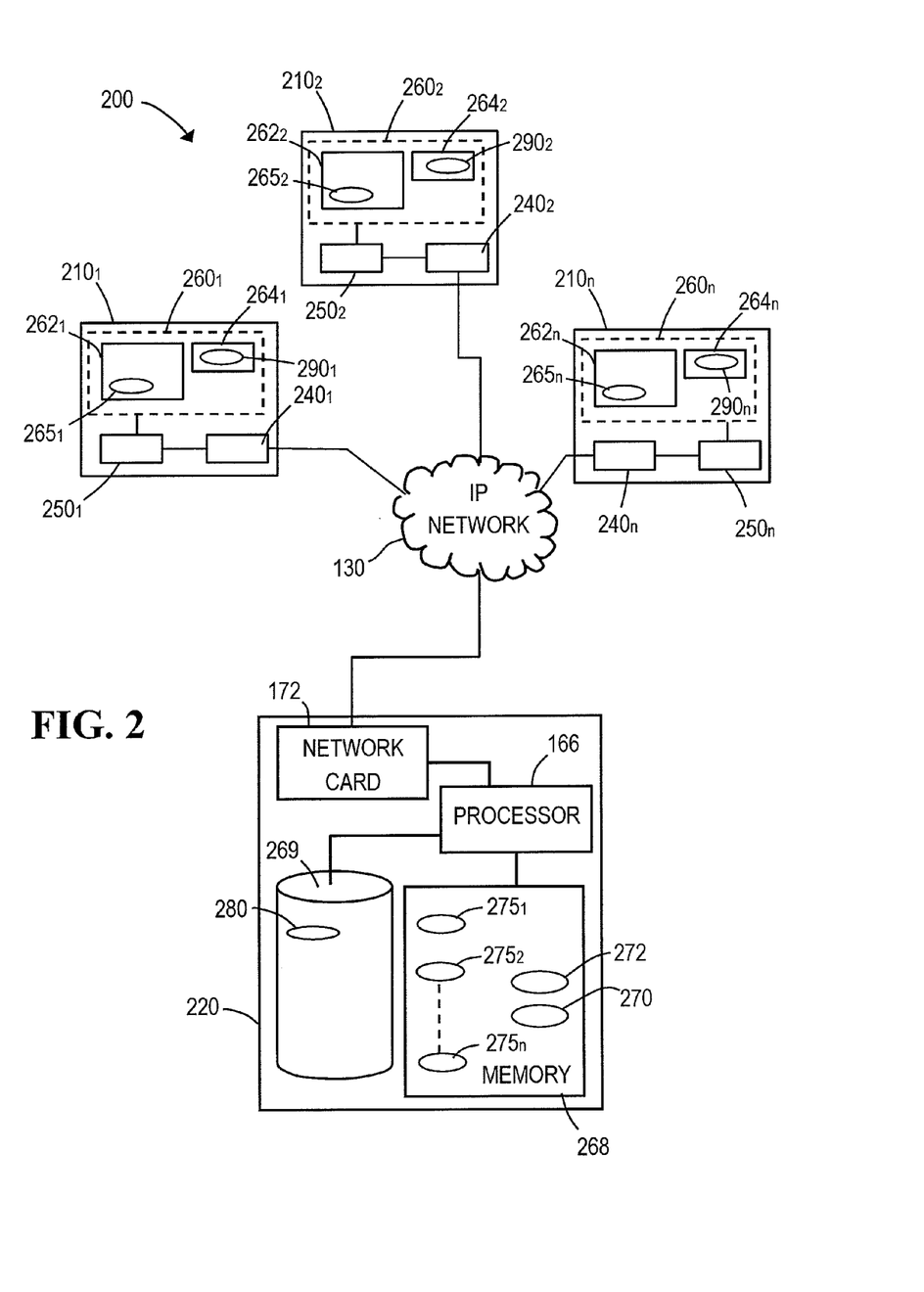
FIG. 2 is a schematic diagram illustrating a plurality of ATMs connected to a remote server via a network so that these ATMs can receive access to a virtualized operating system and ATM application using a remote desktop infrastructure, according to a second embodiment of the present invention.

FIG. 2 illustrates a system 200 which includes multiple Automated Teller Machines (ATMs) $210_{1...n}$ and illustrates how these are connected to a remote server 220 via the IP network 130 according to a second embodiment of the present invention. It should also be appreciated (although this is not illustrated in FIG. 2) that the remote server 220 is connected to a conventional transaction switch and/or authorization host (either via the IP network 130 or via a dedicated connection) to authorize transactions performed at one of the ATMs $210_{1...n}$ in the system 100.

Each ATM 210 includes different modules for enabling transactions to be performed and recorded by the ATM 210. These ATM modules (not shown in FIG. 2) include customer transaction modules and service personnel modules. The ATM modules include an ATM customer display, a card reader/writer module, an encrypting keypad module, a receipt printer module, a cash dispenser module, a journal printer module and the like. Each ATM 210 includes a network connection module (in the form of an Ethernet card) 240 which is connected to the remote server 220 via the IP network 130. Each ATM 210 includes a processor $250_{1 \ldots n}$ which can read from local memory $260_{1 \ldots n}$ (shown by the broken line in FIG. 2 to indicate that it comprises a logical address space). The local memory $260_{1 \ldots n}$ comprises, inter alia, DRAM 262, and non-volatile RAM 264 (which is used to store a recovery program).

Each ATM $210_{1 \ldots n}$ receives access to a virtualized operating system and ATM application at that ATM $210_{1 \ldots n}$. Customer transactions, and service engineer maintenance operations, are performed at the ATM $210_{1 \ldots n}$ using the access to the virtualized operating system and ATM application. The three ATMs $210_{1 \ldots n}$ shown in FIG. 2 receive access to the virtualized operating system and ATM application via a Virtual Desktop Infrastructure (VDI) mechanism. This separates the operating system environment and associated application software from the physical client device (the ATM $210_{1 \ldots n}$) that is used to access it.

For each ATM 210 application, execution takes place on a remote operating system which is linked to the ATM $210_{1 \ldots n}$ over a network using a remote display protocol through which the user (a customer or a service engineer at that ATM) interacts with the operating system and ATM application. Each ATM $210_{1 \ldots n}$ includes a thin client $265_{1 \ldots n}$ which communicates with a remote server 220.

The remote server 220, which is remote from each ATM $210_{1 \ldots n}$, comprises one or more processors 166 and a network connection 172 (in the form of an Ethernet card) to provide access to the IP network 130. The remote server 220 also includes a memory 268 and disk storage space 269. The disk storage space 269 provides non-volatile storage for various files used by the server 220, including a generic template file 280. The generic template file 280 relates to an operating system and ATM application for the ATMs $210_{1 \ldots n}$. If a different ATM application is required on a first set of ATMs to a second set of ATMs (each set comprising one or more ATMs), then two different template files 280 may be used; but in this embodiment, only a single generic template file 280 is required. In this embodiment, having a different network connection module 240 in some of the ATMs $210_{1 \ldots n}$ does not require a different generic template file 280.

The server 220 includes a server hardware platform (SHP) running a conventional hypervisor 270 (which supports and implements a virtual desktop infrastructure service) in the memory 268. The hypervisor 270 used in this embodiment is a vSphere (trade mark) hypervisor, available from VMware, Inc., 3401 Hillview Ave, Palo Alto, Calif. 94304, U.S.A. The server 220 also executes a VDI manager 272 (in this embodiment, VMWare Horizon View (trade mark) available from VMWare.

The hypervisor 270 allows multiple operating systems to execute on the same hardware.

The VDI manager 272 is used to set up the VDI environment, create the generic template file 280 and provide security controls, certificates, and the like.

The server 220 also includes multiple instances $275_{1 \ldots n}$ of the generic template file 280. There is at least one instance $275_{1 \ldots n}$ of the generic template file 280 for each ATM $210_{1 \ldots n}$ that is active in the system 200. Each of these instances $275_{1 \ldots n}$ executes in the memory 268.

Each ATM 210 is linked to the server via the IP network 130 using a conventional remote display protocol which enables a customer or service engineer at an ATM to interact with the remote operating system and ATM application (executing as an instance $275_{1 \ldots n}$ of the generic template file 280). The remote display protocol used by each ATM $210_{1 \ldots n}$ in the system illustrated in FIG. 2 is PCoIP.

When one of the ATMs (for example, ATM $210_1$) boots up, the thin client $265_1$ in that ATM $210_1$ connects to the server 220 and a communication session is established. The ATM $210_1$ provides the server 220 with information about modules that are present on the ATM $210_1$. This information is basic information conveyed via a bus protocol (for example, USB). The thin client $265_1$ records a unique port number for each module that is connected to the ATM $210_1$.

When the server 220 receives the initial communication from the ATM $210_1$, the server 220 creates, or allocates an already created, instance $275_{1 \ldots n}$ of the generic template file 280 to that ATM $210_1$ The instance $275_{1 \ldots n}$ created for (or allocated to) that ATM $210_1$ then conveys information to that ATM $210_1$, including display information and device-specific (or module-specific) data.

The ATM $210_1$ receives that conveyed information and routes the received information based on the port number assignments. For example, display information is conveyed to a processor in the ATM $210_1$ for rendering on a customer display (or a service engineer display) depending on the routing information associated with that data. If the ATM $210_1$ receives information that is intended for a device (or module) identified as, for example, port number four, then the thin client $265_1$ routes this information to that device (or module). For example, the information may be a command to initialize a card reader module, and the card reader module may be connected to port number four. Although the ATM $210_1$ does not know that the device on port number four is a card reader, the instance $275_1$ knows this, and so the instance $275_1$ provides the correct command together with routing information that identifies the port number to the thin client $265_1$. This enables the thin client $265_1$ to route the command correctly, even though the thin client $265_1$ does not understand the command or know the type of device the command relates to.

User inputs provided by a customer at an ATM 210 are detected by an appropriate device or module in the ATM 210. For example, a keyboard press to indicate a transaction being selected by a user is detected by the encrypting keypad module and conveyed to the thin client $265_1$ The thin client $265_1$ receives data from the device or module (the terms device and module are used interchangeably herein) as data conveyed from the port associated with that device. The thin client $265_1$ then conveys this data to the server 220 together with the port number information.

The server 220 relays this information to the instance $275_1$, which can interpret the meaning of this user input (that is, the type of transaction selected). In this manner, all user inputs at the ATM 210 are conveyed to the instance $275_1$ for that ATM 210.

Similarly, if a device or module in the ATM 210 detects an event (for example, a currency low event in a cash dispenser), then that device or module conveys that event to the thin client $265_1$. Again, the thin client $265_1$ forwards this to the server 220 together with the port number information for that device. The server 220 relays this information to the instance $275_1$ for that ATM 210, which can interpret the meaning of this event.

The instance $275_1$ for that ATM 210 sends display information and device-specific data in response to these user inputs and/or events. The thin client $265_1$ for that ATM 210 routes this received information based on the port number information provided therewith. For example, the display information is routed to the customer display. Card reader information (which may include low level commands that only firmware on that device can understand—that is, device-specific data) is routed to the port number that is associated with the card reader. The thin client $265_1$ is not (and does not need to be) aware of the type of device associated with each port number because the thin client $265_1$ is merely routing the information according to the port number provided with that information.

It should now be appreciated that display data, device specific data, and routing information for the device specific data at the ATM 210 is received at the ATM 210 from the remote server 220 (specifically, from the instance $275_1$ for that ATM 210) responsive to the inputs and events at the ATM 210. Display data can be presented to a customer via a customer display of a user interface at the ATM 210 and device specific data can be conveyed to a respective device at the ATM 210 (such as a card reader, a receipt printer, or a dispenser) based upon routing information that is common to both the ATM 210 and the instance $275_1$ for that ATM 210. Thereafter, one or more functions are implemented by the various devices at the ATM 210 in response to the device specific data received from the instance $275_1$ for that ATM 210.

On start-up of the ATM 210, a recovery program $290_{1\ldots n}$ is executed in the non-volatile RAM 264 of the ATM 210. That is to say, for each ATM a respective non-volatile RAM 264 executes a recovery program 290. This ensures that from the time of an initial start-up operation there is always a recovery program 290 executing locally at the ATM 210.

The recovery program $290_{1\ldots n}$ in each ATM 210 uses the connection module $240_{1\ldots n}$ to monitor a network connection between that ATM 210 and the server 220. Because an ATM 210 receives access to a virtualized operating system and ATM application it is important that a communication link between the ATM 210 and the server 220 providing access to the virtualized operating system and ATM application remains in a communicative state. The recovery program 290 which constantly executes on an ATM 210 monitors the state of the communication link.

The recovery program 290 prevents any media that is part of an unfulfilled transaction from being accessible to a subsequent customer. This is implemented by the recovery program 290 communicating directly with devices in the ATM 210 (such as a customer display, a cash dispenser module, a card reader module, and the like) to ascertain the status of such devices (for example, media present in device, media being presented to a customer, media retracted to purge bin, and the like).

The recovery program 290 is operable to issue instructions to those devices to ensure that media provided as part of the interrupted transaction is not accessible to a subsequent customer. These instructions may be to request the device to retain or purge any media that has been prepared for presentation to the customer, but not yet presented. These instructions may also be to request the device to retract any media presented to a customer but not removed within a defined time limit (such as thirty seconds).

If the communication link fails, the recovery program 290 takes over control of the ATM 210. That is to say, the recovery program 290 includes code to provide instructions for dealing with a communication link failure so that such a failure can be indicated to a customer at the ATM 210 via the customer display and/or any customer card previously inserted into the ATM 210 can be returned via a card reader module.

The recovery program 290 also includes instructions for continually monitoring the communication link after a failure and identifying when a communication link is re-established between the ATM 210 and the remote server 220. When this occurs, the recovery program 290 initiates a reconciliation process identifying details of any transaction which may have been partly performed about the time of a communication link failure. Thereafter, the ATM 210 is again provided with access to a virtualized operating system and ATM application from the remote server 220 so that normal operation of the ATM 210 can resume.

It should be appreciated that the remote server 220 is connected to a conventional transaction switch and/or authorization host (either via the IP network 130 or via a dedicated connection) to authorize transactions performed at one of the ATMs $210_{1\ldots n}$ in the system 200.

Various modifications may be made to the above described embodiments within the scope of the present invention. For example, in other embodiments, the network 130 may be a Local Area Network (LAN), a public Wide Area Network (WAN), or any other convenient network.

In variations of the first embodiments, more than one instance of an image file 180 may be stored remotely at the server 120. These multiple instances may be used for ATMs manufactured by different companies, or for ATMs that access different ATM applications.

In another variation of the first embodiment, the recovery program $190_{1\ldots n}$ may be stored in the non-volatile RAM 164, which is part of the address space (local memory 160) accessible by the processor $150_{1\ldots n}$. In this way, the processor $150_{1\ldots n}$ can always execute the recovery program $190_{1\ldots n}$ directly from the non-volatile RAM 164, and new memory pages, incoming as a new portion of the image file 180, are stored in the DRAM 162, so they will not overwrite the recovery program because this is stored in non-volatile RAM 164 (that is, in a different part of the address space).

In yet another variation of the first embodiment persistent execution of the recovery program could also be achieved via an addressing mechanism for new pages so that a recovery program is written once to part of the DRAM 162 which is not used for storing the received portions of the image file 180.

In variations of the second embodiment, other remote display protocols, such as the Remote Desktop Protocol (RDP) or the like, can be utilized.

In other embodiments, Citrix HDX (trade mark) may be used instead of VMWare Horizon View. Citrix HDX is available from Citrix Systems Inc., 4988 Great America Parkway, Santa Clara, Calif. 95054, U.S.A.

The particular locations in which files, or portions thereof, are shown to reside and/or execute are given by way of example to illustrate the embodiments more clearly, and are not restrictive.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of operating Automated Teller Machine (ATM), comprising the steps of:
   receiving access to a virtualized operating system and ATM application at an ATM through a thin-client of the ATM;
   executing a recovery program on the ATM that is constantly running and monitoring network access of the ATM to the virtualized operating system for recovery processing;
   loading the thin-client during each boot of the ATM, recording port assignments to devices of the ATM by the thin-client, and reporting by the thin-client the port assignments and devices to the virtualized operating system for processing by the ATM application; and
   performing a customer transaction at the ATM using the access to the virtualized operating system and ATM application utilizing the port assignments to the devices associated with the ATM and taking control of the ATM by the recovery program when the network access experiences a failure during the customer transaction and causing, by the recovery program, any media dispensed by a dispenser of the ATM and unremoved by a customer during the customer transaction with a configured period of elapsed time to be retracted back into a purge bin of the ATM.

2. The method as claimed in claim 1 wherein the step of receiving access to the virtualized operating system and application comprises the sub-steps of:
   receiving a first portion of an operating system and ATM application at the ATM from a remote server via a communication link, whereby the first portion of the operating system and application comprises a portion of the operating system and ATM application that is currently required by the ATM;
   executing the received first portion in memory at the ATM until the ATM requires a second portion of the operating system and ATM application;
   requesting a second portion of the operating system and ATM application;
   receiving the second portion of an operating system and ATM application at the ATM from a remote server via the communication link; and
   executing the received second portion in memory at the ATM.

3. The method as claimed in claim 2, further comprising: the sub-step of receiving a first portion of an operating system and ATM application comprises the sub-step of receiving the first portion of the operating system and application as a plurality of memory pages; and
   the sub-step of executing the received second portion in memory at the ATM optionally comprises the sub-step of over-writing memory pages containing the first portion of the operating system and ATM application currently stored in memory with the received plurality of memory pages corresponding to the received second portion of the operating system and ATM application.

4. The method as claimed in claim 3, further comprising the step of:
   obtaining processing control by the recovery program, for use when the communication link fails, in an area of memory different to an area of memory over-written by received portions of the operating system and application.

5. The method as claimed in claim 3, wherein the step of receiving portions of the operating system and the application comprises:
   refreshing the recovery program as part of the plurality of memory pages received each time a new portion of the operating system and ATM application is received at the ATM.

6. The method as claimed in claim 1 wherein the method further comprises the steps of:
   receiving user inputs from the customer at the ATM;
   monitoring events occurring at the ATM; and
   providing, via a communication link, at least one of the received user inputs or the monitored events to a remote server executing the operating system and ATM application; whereby
   the step of receiving access to the virtualized operating system and ATM application further comprises the steps of:
      receiving, at the ATM, display data, device specific data and routing information for the device specific data from the remote server responsive to said inputs or events; presenting the display data to the customer;
      conveying the device specific data to a device at the ATM based on the routing information; and
      implementing, at the device, one or more functions in response to the device specific data.

7. The method as claimed in claim 6, further comprising: receiving the display data, device specific data, and routing information is implemented using a client associated with a virtual desktop infrastructure.

8. The method as claimed in claim 7, further comprising: the operating system and ATM application includes (i) a conventional (off-the-shelf) operating system, (ii) an ATM platform that extends and enhances the operating system to manage devices that are specific to an ATM, and (iii) an ATM application that allows customers to perform transactions at an ATM and service engineers to exercise devices at the ATM.

9. A method of operating an Automated Teller Machine (ATM), comprising the steps of:
   determining if a communication link between an ATM and a remote server that provides the ATM with access to a virtualized operating system and ATM application is in a non-communicative state through a thin client of the ATM;
   loading the thin client during each boot of the ATM, recording port assignments to devices of the ATM by the thin client, and reporting by the thin client the port assignments and devices to the virtualized operating system for processing by the ATM application; and if the communication link is in a non-communicative state, operating the ATM without requiring communication with the remote server through a recovery program that is constantly executing on the ATM and utilizing the port assignments to the devices associated with the ATM and taking control of the ATM by the recovery program when the communication link experiences a failure during a customer transaction and causing, by the recovery program, any media dispensed by a dispenser of the ATM and unremoved by a customer during the customer transaction within a configured period of elapsed time to be retracted back into a purge bin of the ATM.

10. The method as claimed in claim 9, wherein the step of determining if a communication link is in a non-communicative state includes the step of pinging an IP address of the server.

11. The method as claimed in claim 9, wherein the step of operating the ATM without requiring communication with the remote server includes the sub-step of:
  transferring control of the ATM to the recovery program executing in local memory at the ATM.

12. The method as claimed in claim 11, further comprising:
  receiving the recovery program from (i) the remote server or (ii) local non-volatile storage at the ATM.

13. The method as claimed in claim 12, further comprising:
  (i) receiving the recovery program from the local storage prior to the customer transaction and executing that recovery program in an area of memory not used by the received portions of the operating system and ATM application.

14. The method as claimed in claim 9, further comprising:
  subsequent to a communication link being in a non-communicative state, initiating a reconciliation process with the server when the communication link is re-established.

15. An Automated Teller Machine (ATM) for performing customer transactions using access to a virtualized operating system and ATM application, comprising:
  a user interface for receiving customer input;
  a network connector connectable, via a network, to a remote server that provides the ATM with access to a virtualized operating system and application; and
  at least one processor and associated memory; wherein
  a customer transaction is performed by the ATM accessing the virtualized operating system and application through a thin client of the ATM utilizing port assignments to devices associated with the ATM and wherein a recovery program is constantly running on the ATM and monitoring the ATM network access to the virtualized operating system, and wherein during each boot of the ATM, a thin client is loaded into memory of the ATM and executed by the at least one processor, the thin client records the port assignments to the devices of the ATM and reports the port assignments and the devices to the virtualized operating system for utilization during the customer transaction, wherein the recovery program is configured to and take control of the ATM when the network access experiences a failure during the customer transaction and cause any media dispensed by a dispenser of the ATM within a configured period of elapsed time and unremoved by a customer during the customer transaction to be retracted back into a purge bin of the ATM.

* * * * *